United States Patent [19]

Augem

[11] Patent Number: 5,075,044

[45] Date of Patent: Dec. 24, 1991

[54] PROCESS FOR THE RADIOACTIVE DECONTAMINATION OF AN OIL

[75] Inventor: Jean-Michel Augem, Lagnieu, France

[73] Assignee: Electricite De France Service International, Paris, France

[21] Appl. No.: 68,354

[22] Filed: Jun. 30, 1987

[30] Foreign Application Priority Data

Jul. 7, 1986 [FR] France ............................... 86 09843

[51] Int. Cl.[5] ........................ G21F 9/08; C09K 11/04; C10G 17/00; C10G 17/06

[52] U.S. Cl. .................................... 252/631; 208/183; 208/252; 208/265; 208/266; 208/271; 208/275; 208/279; 208/281; 208/310 Z; 210/679; 210/682; 210/688; 210/754; 210/912; 252/626; 252/635

[58] Field of Search ............... 252/628, 626, 635, 631; 405/128, 129; 210/679, 680, 688, 690, 682, 691, 908, 909, 912, 754; 208/252, 265, 281, 181, 183, 271, 275, 279, 310 Z, 266

[56] References Cited

U.S. PATENT DOCUMENTS

| | | | |
|---|---|---|---|
| 2,852,438 | 9/1958 | Van Dyck Fear et al. | 209/281 |
| 2,902,430 | 9/1959 | Kimberlin, Jr. et al. | 208/252 |
| 2,971,905 | 2/1961 | Bieber et al. | 208/281 |
| 3,095,368 | 6/1963 | Bieber et al. | 208/281 |
| 3,167,504 | 1/1965 | Hayden, Jr. et al. | 210/751 |
| 3,177,137 | 4/1965 | Gordon et al. | 208/265 |
| 3,196,106 | 7/1965 | Haden, Jr. et al. | 210/751 |
| 3,274,784 | 9/1966 | Shock et al. | 252/628 |
| 3,436,339 | 4/1969 | Rudy, Jr. | 208/252 |
| 3,487,928 | 1/1970 | Canevari | 210/751 |
| 3,622,505 | 11/1971 | Tilley et al. | 208/252 |
| 3,764,553 | 10/1973 | Kirby | 252/301.1 R |
| 4,056,112 | 11/1977 | Calmon | 252/631 |
| 4,087,375 | 5/1978 | Tanno | 252/631 |
| 4,113,504 | 9/1978 | Chen et al. | 106/97 |
| 4,132,639 | 1/1979 | Katz et al. | 208/266 |
| 4,439,062 | 3/1984 | Kingsbury | 405/28 |
| 4,448,711 | 5/1984 | Motojima et al. | 210/682 |
| 4,473,477 | 9/1984 | Beall | 210/751 |
| 4,522,702 | 6/1985 | Kukes et al. | 208/252 |
| 4,615,794 | 10/1986 | Belanger | 252/631 |
| 4,681,705 | 7/1987 | Robertson | 252/631 |

FOREIGN PATENT DOCUMENTS 1524693 9/1978 United Kingdom .

OTHER PUBLICATIONS

Hawley, G. 1981. The Condensed Chemical Dictionary, 10th Edition. Van Nostrand Reinhold, New York, p. 322.

*Primary Examiner*—Howard J. Locker

*Attorney, Agent, or Firm*—Pearne, Gordon, McCoy & Granger

[57] ABSTRACT

According to the invention, the oil is passed through a pulverulent material, such as an earth or clay, in the presence of an acid. The pulverulent material can be placed beforehand on a filter or can be mixed with the oil before filtration. If necessary, the oil is recycled through the filter up to complete decontamination.

Application to the radioactive decontamination of oils used in the nuclear industry.

15 Claims, 1 Drawing Sheet

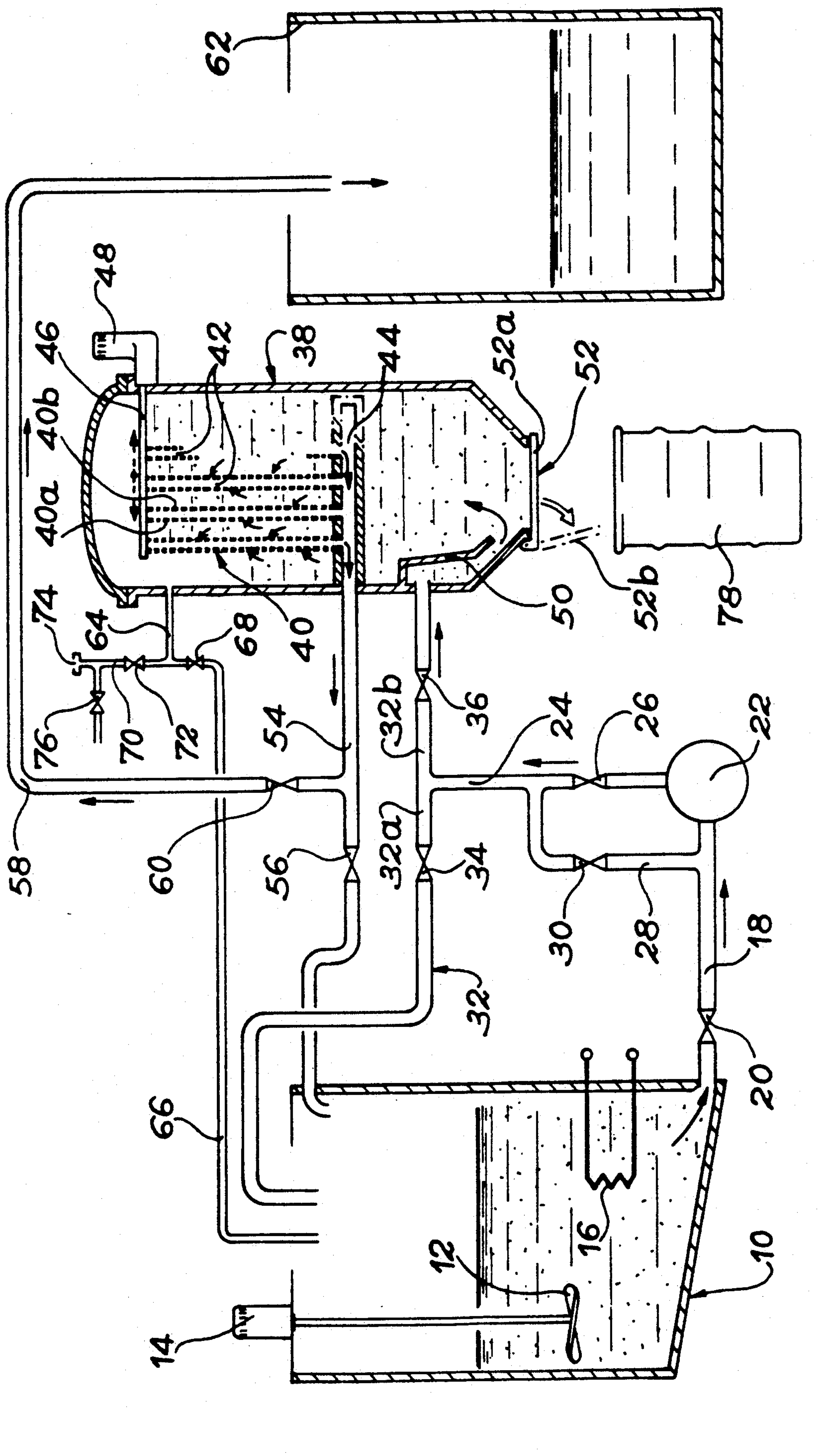
62
48
46
40b
40a
42
38
44
52a
52
74
64
68
40
50
52b
78
76
70
72
54
32b
36
24
26
22
58
60
56
32a
34
30
28
18
32
66
20
12
16
10
14

PROCESS FOR THE RADIOACTIVE DECONTAMINATION OF AN OIL

BACKGROUND OF THE INVENTION

The present invention relates to a process for the radioactive decontamination of an oil more particularly applicable with regards to the decontamination of oils used in nuclear installations.

The, in nuclear installations, oils used in machines, such as e.g. primary pumps, can after a certain time be contaminated by radioactive elements. The activity level varies from to $3.7 \cdot 10^6$ to $3.7 \cdot 10^4$ Bq/m$^3$, as approximate figures the non-contamination threshold being set at $3.7 \cdot 10^3$ Bq/m$^3$. In oils used on primary pumps, the main contaminant is xenon 133, but the latter has a relatively short half-life (5.3 days) and after this time oils are at roughly the same activity level of approximately $3.7 \cdot 10^4$ Bq/m$^3$. Apart from xenon 133, the other radioelements liable to be found in contaminated oils are in particular manganese 54, cobalt 58, cobalt 60, niobium 95, iodine 131, cesium 134, cesium 137 and cerium 144.

The method presently used for getting rid of contaminated oils consists of burning them. This incineration produces on the one hand ash, which can be removed in storage drums, and on the other hand gaseous products which have to be treated. For this purpose, they are passed through so-called absolute filters, i.e. filters which hold back substantially all the dust and solid particles, even when in very fine form.

Although the disposal of the ash causes no particular problems, the treatment of large gas quantities requires large and therefore costly installations. In addition, it is common practice to make do with smaller installations, which only makes it possible to achieve small processing rates in the radioactive decontamination of oils.

SUMMARY OF THE INVENTION

The present invention aims at obviating these disadvantages by proposing a process for the radioactive decontamination of oils, which is not very expensive and makes it possible to obtain an oil with an activity level below $3.7 \cdot 10^3$ Bq/m$^3$.

According to the main feature of the process according to the invention intended for decontamination of an oil containing radioelements, said oil is passed through a pulverulent material in the presence of an acid.

Preferably, the pulverulent material is an earth or clay containing diatoms or bentonites and its grain size is below 0.5 mm. Its mass is preferably between 0.5 and 5% of that of the oil to be treated.

Hydrochloric, phosphoric or sulphuric acid can be used and the aqueous concentration thereof preferably exceeds or is equal to 70%.

Within the present description the word "oil" must be understood in its widest sense and designates both a lubricant and a lubricant base, such as a mineral, animal or vegetable oil.

The decontamination mechanism for an oil by the process according to the invention can be explained in the following way. The acid reacts with the oil to form products such as tars and the radioelements are fixed to said tars. The latter are retained by the pulverulent material and consequently the oil collected has lost at least some of the radioelements. Optionally and as will be seen hereinafter, it may be necessary to recycle the oil through the pulverulent material until it is completely decontaminated.

As stated hereinbefore, within the present description the expression "completely decontaminated" or "decontaminated" means that the activity level of the oil is below $3.7 \cdot 10^3$ Bq/m$^3$.

In a first embodiment of the process according to the invention, it comprises the following stages :

(a) mixing the oil with the pulverulent material,
(b) passing the mixture through a filter able to hold back at least part of the pulverulent material and,
(c) repeating stage (b) for the number of times necessary to obtain the complete decontamination of the oil.

In a second embodiment of the inventive process, the latter comprises the following stages :

(d) placing the pulverulent material on the upstream face of a filter,
(e) passing the oil through said filter covered with the pulverulent material and,
(f) repeating stage (e) for the number of times necessary to obtain the complete decontamination of the oil.

The terms "upstream face" or "downstream face" of the filter used in the present description must be understood with respect to the oil flow direction through the filter. It is also obvious that stages (c) and (f) are optional because, in certain cases, only a single passage of the oil or mixture through the filter will be adequate for removing all decontamination. Finally, in most cases, it is advantageous to heat the oil before passing it through the pulverulent material.

DESCRIPTION OF THE DRAWING AND PREFERRED EMBODIMENTS

The invention will be better understood from the following non-limitative description of embodiments and with reference to the single drawing, which is a diagrammatic vertical sectional view of an apparatus used for performing the inventive process.

The drawing shows that the apparatus according to the invention firstly comprises a preparation vessel 10 equipped with a stirrer 12, which can be moved by a motor 14 and a heating means, e.g. an electrical resistor 16. From the bottom of vessel 10 leads a pipe 18, equipped with a cock or tap 20, which connects vessel 10 to a pump 22. Another pipe 24 equipped with a tap or cock 26 leaves pump 22, which can circulate the liquid contained in vessel 10 in the direction of the arrows in the drawing. A pipe 28 equipped with a tap or cock 30 connects pipe 18, from a point located between tap 20 and pump 22, to pipe 24 at a point on the latter downstream of tap 26 with respect to the liquid flow direction imposed by pump 22. Pipe 24 issues into a pipe 32, which is subdivided into two parts. A first part **32*a* equipped with a cock or tap 34 returns to the upper part of vessel 10, whilst a second part 32*b* equipped with a cock or tap 36 issues into a filter tank 38. The latter has a group of filters 40 which, in the presently represented embodiment, are flat filters placed in the vertical position. These filters are arranged in groups of two, such as e.g. filters 40*a* and 40*b* and thus define an inner space 42 communicating in its lower part with a collector 44. The lower part of the filters is fixed to the wall of collector 44 and the upper part thereof to a frame 46, which can be vibrated by a vibrator 48**. The function of the latter will be explained hereinafter.

A deflector 50 is located in the lower part of filter tank 38 below collector 44 at the point where pipe 32 issues. The position of said deflector 50 is such that it forces the oil entering tank 38 to pass through the bottom thereof before rising into the zone where the filters are located. Finally, tank 38 is sealed in its lower part by a trapdoor 52, which moves between a closed position 52*a* shown in continuous line form and an open position 52*b* indicated in broken line form.

Collector 44 communicates with a pipe 54 placed outside filter tank 38 and is equipped with a cock or tap 56. At its end opposite to tank 38, pipe 54 issues into the upper part of the preparation vessel 10. To a point on pipe 54 between the filter vessel 38 and tap 56 is connected a discharge pipe 58 equipped with a cock or tap 60, which issues into a reception tank 62 used for recovering the decontaminated oil.

The drawing also shows a pipe 64 leaving the upper part of filter tank 38 and which is subdivided into two branches. A first branch 66 equipped with a cock or tap 68 returns to the upper part of the preparation vessel 10. A second branch 70 equipped with a cock or tap 72 is linked with an air source, which supplies a dry, lubricated air via cock or tap 76 to vibrator 48 and to trapdoor 52.

Decontamination takes place with such an apparatus in the manner indicated hereinafter. With the tap 20 closed, the oil to be treated is firstly introduced into the preparation vessel 10. If necessary, the oil is heated with the aid of resistor 16 until the desired temperature is reached, a temperature of approximately 110° C. being suitable in almost all cases. In order to homogenize the product to be treated, the latter is stirred by the stirrer 12 moved by motor 14. When the desired temperature is reached, the desired quantity of pulverulent material, e.g. earth or clay is introduced in to the oil. Heating makes it possible to improve the viscosity of the oil and also to eliminate water or other solvents which would not be miscible with the oil. These solvents could in fact have a prejudicial effect on the clay, which could destroy the decontamination quality. Moreover, stirring improves the contact between the pulverulent material and the oil to be treated.

When the mixture is sufficiently homogeneous, tap 72 and 76 are closed and taps 20, 26, 36, 56 and 68 are opened, all the other taps being closed. Pump 22 is then started up, which has the effect of circulating the mixture from the preparation vessel 10 to the filter tank 38 through pipes 18, 24 and 32*b*. The mass of oil progressively invades almost the entire volume of the filter tank 38. With the oil level rising in the filter tank, part of the oil flows out through pipes 64 and 66 and returns to the preparation vessel 10. Pipes 64 and 66 constitute a vent, making it possible to ensure that the liquid occupies almost the entire volume of the filtration vessel.

Moreover, the major part of the oil passes through filters 40 and penetrates the spaces 42 located between filters 40*a* and 40*b* of each group of two filters. Thus, part of the pulverulent material is deposited on the upstream face of each filter, this face being that located on the side opposite to space 42. The oil filtered in this way passes into collector 44 and from there into pipe 54 and returns to the preparation vessel 10.

As filters 40 are designed in such a way as to hold back at least part of the pulverulent material mixed with the oil to be treated, a first layer of said material, called a prelayer, is deposited on the upstream face of the filter. Thus, the oil in collector 44 is at least partly purified and is returned to vessel 10. As pump 22 is still operating, the oil is recycled through the filters. During each passage, a further quantity of pulverulent material is held back, either by the filter, or by the already deposited layer. Thus, a cake of pulverulent material is formed. As will be shown hereinafter, the filter and clay layer deposited on the upstream face thereof retains the radioelements contained in the oil.

At the end of a certain number of cycles, the oil passing through the filters 4 and returning to vessel 10 is completely decontaminated, i.e. its activity is below $3.7 \cdot 10^3$ Bq/m$^3$. The latter can easily be determined by analysis by sampling operations carried out in the preparation vessel. When the oil is decontaminated, tap 60 is opened and tap 56 closed. Thus, pump 22 passes the decontaminated oil into the reception tank 62 via pipe 58. When the reception tank 62 is full, the decontaminated oil can be recovered and discharged.

It is pointed out that, because the oil is forced through the filters or through the cake deposited on the latter, a certain pressure of approximately 5 bars prevails in the filter tank 38. Pipes 64 and 66 and tap 68 act as a vent making it possible to maintain the pressure within the tank 38 within the reasonable limits and preventing same from reaching excessive values.

As the oil is expelled into the reception tank 62, the level in the preparation vessel 10 drops. When this level has reached a predetermined value, tap 56 is opened and tap 60 closed. Tap 72 is opened in order to pass compressed air into the filter tank and maintain the pressure within the latter. This is followed by the closing of tap 26 and the immediate stoppage of pump 22. Tap 34 is then opened so that, under the effect of the pressure of the compressed air, the remainder of the oil in the filter tank is returned to vessel 10 via pipe 32. When there is no longer any oil in tank 38, which can be determined by visual observation when there is no longer any oil entering vessel 10 through pipes 54 and 32, taps 34 and 56 are closed. At this time, compressed air is passed into the tank 38 to dry the cake which has deposited on the filters, whereby one or other of the taps 34 and 56 can be opened in order to allow the air to escape.

When the cakes are dry (the necessary time being easily determinable by prior tests), tap 68 is opened to reduce the pressure within tank 38. This is followed by the closure of all the taps, except tap 68, which makes it possible to introduce air under normal pressure into the tank. Trap door 52 is opened and passes from the closed position 52*a* to the open position 52*b* and vibrator 48 is started up. Under the effect of these vibrations, the pulverulent material layers deposited on the filters are detached and drop into a drum 78, which has previously been placed beneath tank 38. When drum 78 is full it can be removed to a storage point.

Optionally, instead of mixing the pulverulent material with the oil within vessel 10, said material can be directly placed on the upstream face of filters 40 and then the oil is circulated as hereinbefore, the process being exactly the same as previously described.

A description will now be given of a few tests performed in the laboratory in order to test the effectiveness of the process according to the invention.

EXAMPLE 1

In this test 200 cm$^3$ of an oil from a primary pump of a nuclear power station was treated having an initial activity of $2.7 \cdot 10^4$ Bq/m$^3$. To this oil was added 5 g of a clay with the following characteristics:

apparent density of the non-tamped clay : 450±40 g/l
apparent density of the tamped clay : 670±60 g/l specific gravity : approx : 2.4 kg/l Physical and Chemical Properties humidity (2 h, 110° C.) : max 7%
loss on ignition (1000° C.) : max 7%
pH (10% suspension) : 2.5–3

Grain Size Analysis (Screening)

150 m (DIN 40) : 97%
70 m (DIN 80) : 88%
60 M (DIN 100) : 80%

Chemical Composition $SiO_2$, $Al_2O_3$, $Fe_2O_3$, CaO, $Na_2O$, $K_2O$.

The values given are mean values.

The material is a bentonite washed with hydrochloric acid and then calcined marketed by SudChemie AG, Munich under the reference TONSIL OPTIMUM FF.

The mixture was stirred for 30 minutes at ambient temperature, which was approximately 22°. The mixture was then filtered in vacuo on a filter paper. A cake formed and was retained by the filter. The activity of the filtrate was measured and was below $3{\cdot}7.10^3$ Bq/m$^3$.

EXAMPLE 2

200 cm$^3$ of the same oil as in example 1 were firstly heated, accompanied by vigorous stirring, until the temperature stabilized at around 110° C. This was followed by the addition of 3 g of the same clay as in example 1 and the mixture was stirred for 30 minutes at 110° C. The mixture was then filtered under the same conditions as hereinbefore and a filtrate was obtained with an activity below $3.7{\cdot}10^3$ Bq/m$^3$.

EXAMPLE 3

200 cm$^3$ of the same oil as in the preceding examples were mixed at ambient temperature (i.e. approx 22° C.) with 3 g of a sulphuric acid-activated clay. For this purpose a few drops of concentrated sulphuric acid were added to the 200 cm$^3$ of oil before carrying out mixing. The clay had the following characteristics :
colour : white
density : moist 320 g/l, apparent 180 g/l.

Grain Size Distribution

600 μm screen oversize = 1.0% max
104 μm screen oversize = 5% mean
pH = 10
specific surface = 1.5–2 m$^2$/g
porosity = 75–85%
Chemical Analysis
$SiO_2$ 91.2%,
$Al_2O_3+Fe_2O_3$ 4.6%,
$CaO+MgO$ 0.8%,
$Na_2O+K_2O$ 2.5%,
$H_2O$ 0.1%.
ignition loss 0.3%
permeability in Darcies 1.1% approx .

The material was a lacustrine diatomaceous earth. Firstly extracted selectively and then ground, the ore is then fritted, i.e. undergoes calcination with the prior addition of a flux. This treatment produces a larger particle and which is consequently more permeable. The material is then cycloned to obtain different grain sizes. The mixture was stirred for 30 minutes, then filtered under the same conditions as hereinbefore. The activity level of the filtrate was below the contamination threshold, i.e. below $3.7{\cdot}10^3$Bq/m$^3$.

EXAMPLE 4

200 cm$^3$ of the same oil as hereinbefore were firstly mixed with a few drops of concentrated sulphuric acid and and then with 3 g of the earth used in example 3. The oil was heated, accompanied by stirring, to a temperature of approximately 110° C. before being mixed with the earth. The mixture was stirred for 10 minutes at 110° C. and was then filtered under the same conditions as hereinbefore. After cooling, the total activity of the filtrate was measured and was found to be $3.7{\cdot}10^3$ Bq/m$^3$.

It should be noted that for these laboratory tests, a single passage through the filter was sufficient to entirely decontaminate the oil. This is due to the fact that the filter papers used had extremely fine pores and were therefore able to retain all the earth. In the case of an industrial usage with the apparatus illustrated in the drawing, the filters have wider meshes, which only retain part of the earth and it is consequently necessary to recycle the oil until all the earth or all the pulverulent material has deposited on the filter.

The decontamination mechanism can be explained as follows. The radioelements contained in the oils to be treated can either be in the form of solid particles or in the form of dissolved compounds, or in the form of compounds in the colloidal state. The solid particles can naturally be present in the oil, or have been formed by the reaction of the acid with the oil, as stated hereinbefore. Decontamination takes place by the combined action of three effects. There is firstly a mechanical filtration effect, the filters stopping the earth or solid particles containing the radioelements, said filtration effect being increasingly important during the recycling of the oil, because the action of the progressively deposited cake is added to that of the actual filter. Moreover, when using as the pulverulent material an earth containing diatomes, the particles containing the radioelement are absorbed or adsorbed on the skeleton of the diatomes, because the fluid is forced into the pores of the latter. This even more true in the case where the mixture is recycled and where it is passed through the filter again, because as the earth or pulverulent material is deposited on the filter, a pressure increase is observed. Finally, there is a chemical effect, particularly in the case where use is made of an acid-activated earth. Thus, the radioelement can react with the activation acid or the compounds constituting the earth, which leads to a precipitation within the pulverulent material and further improves the absorption or adsorption.

Other examples of tests performed in the laboratory under the same conditions as in examples 1 to 4 will now be given, but in which other oils were used.

EXAMPLE 5

200 cm$^3$ of an oil from a lifting reduction gear were heated for 15 minutes at 110° C. and then mixed with 5 g of the earth used in example 1. The mixture was stirred at this temperature for 30 minutes. A single passage through a filter paper, like those used in examples 1 to 4, made it possible to reduce the activity of said oil, which was initially $5.2{\cdot}10^4$ Bq/m$^3$, to a value below $3.7{\cdot}10^3$ Bq/m$^3$.

EXAMPLE 6

The same oil as in example 5 was heated to 110° C. for 15 minutes and then mixed with a pulverulent material constituted by 4 g of the earth or clay used in examples 1 and 2 mixed with 2 g of the earth or clay used in examples 3 and 4. Here again it was possible to reduce the activity level, which was initially $5.2 \cdot 10^4$ Bq/m$^3$ to a value below $3.7 \cdot 10^3$ Bq/m$^3$.

EXAMPLE 7

200 cm$^3$ of an oil used on a steam generator crane and having an activity of $3.10 \cdot 10^4$ Bq/m$^3$ were heated at 110° C. for 15 minutes and then mixed with 3 g of the earth used in example 5. Filtration of filter paper made it possible to obtain an oil with an activity below $3.7 \cdot 10^3$ Bq/m$^3$.

Thus, the process according to the invention has particularly advantageous characteristics. The first advantage is that it is not expensive to perform, because the apparatus used can be realized with the aid of simple, readily commercially available components. Such an apparatus also consumes little energy. Moreover, the treatment capacity is high, because it is possible to treat several cubic meters of contaminated oil everyday, whereas with the prior art incineration methods, in order to avoid having excessively large and expensive installations, one may do with smaller installations only able to treat a few liters daily. Finally, after treatment, a good quality oil is recovered in the reception tank and which can be reused in a nuclear installation, even in the same one as that from which it was taken, optionally after the addition of the few adequate additives.

The invention is not limited to the embodiments described and numerous variants thereof are possible without passing beyond the scope of the invention. Thus, the shape and nature of the filters can be chosen as a function of the nature of the oil to be treated and the dimensions of the installation and the power of the pump can be adapted as a function of the flow rate to be treated, or any component of the apparatus can be replaced by an equivalent component.

What is claimed is:

1. A process for the radioactive decontamination of an oil containing radioelements, comprising the steps of:
(a) mixing said oil with a pulverulent material in the presence of an acid selected from the group consisting of hydrochloric acid, phosphoric acid, and sulfuric acid to form a mixture thereof;
(b) passing the mixture through a filter able to retain at least part of the pulverulent material; and
(c) repeating step (b) the number of times necessary to obtain a decontaminated oil filtrate and separating said decontaminated oil filtrate from the pulverulent material together with said radioelements.

2. A process for the radioactive decontamination of oil containing radioelements comprising the steps of:
(a) placing the pulverulent material on an upstream face of a filter for contact with said oil in the presence of an acid selected from the group consisting of hydrochloric acid, phosphoric acid, and sulfuric acid;
(b) passing the oil through said filter covered with the pulverulent material; and
(c) repeating step (b) the number of times necessary to obtain a decontaminated oil filtrate and separating said decontaminated oil filtrate from the pulverulent material together with said radioelements.

3. A process for the radioactive decontamination of an oil containing radioelements, comprising contacting said oil with a pulverulent material while reacting a portion of the oil with an acid to provide filterable reaction products including tars having radioelements fixed thereto, and filtering said oil to separate said pulverulent material, reaction products and any other filterable constituents present in the oil from a filtrate of decontaminated oil, said acid being selected from the group consisting of hydrochloric acid, phosphoric acid and sulfuric acid.

4. A process according to claim 3, wherein said other filterable constituents include particles in suspension in the oil which contain radioelements and particles precipitated by the acid in the oil which contains radioelements.

5. A process according to claim 4, wherein said oil is substantially free of water contaminants.

6. A process according to claim 5, including the step of heating the oil to remove water contaminants prior to the step of reacting a portion of the oil within the acid.

7. A process according to claim 1, 2, or 3, wherein the pulverulent material comprises diatomaceous earth or bentonite.

8. A process according to claim 1, 2, or 3, wherein the pulverulent material has a grain size below 0.5 mm.

9. A process according to claim 1, 2, or 3, wherein the pulverulent material is between 0.05 and 5% of the mass of the oil to be treated.

10. A process according to claim 1, 2, or 3, wherein the aqueous concentration of the acid used is equal to or above 70%.

11. A process according to claim 1, 2, or 3, wherein the oil is heated before passing it through the pulverulent material.

12. A process according to claim 1, 2, or 3, wherein said acid is an acid reagent added directly to the oil.

13. A process according to claim 1, 2, or 3, wherein said acid is an acid component of said pulverulent material.

14. A process according to claim 1, 2, or 3, wherein said radioelements are selected from the group consisting of xenon 133, manganese 54, cobalt 58, cobalt 60, niobium 95, iodine 131, cesium 134, cesium 137 and cerium 144.

15. A process according to claim 14, wherein the activity level of said radioelements present in the oil prior to decontamination is in the range of from about $3.7 \times 10^6$ Bq/m$^3$ to about $3.7 \times 10^4$ Bq/m$^3$.

* * * * *